3,148,990
RADIATION TREATMENT OF CITRUS FRUITS
Charles H. Lister, Jr., Oldsmar, Fla.
No Drawing. Filed May 16, 1960, Ser. No. 29,131
2 Claims. (Cl. 99—103)

This invention relates to radiation treatment methods and is particularly concerned with the treatment of edible agricultural products by radiations, and particularly as a method of modifying skin, peel or rind characteristics, sterilization, bacteria destruction, drying and wax or other coating treatment, and the like.

While certain aspects of the inventive concept of the present invention may be carried out by the use of various types of radiation, the specific method herein set forth is directed to the use of infra-red heat radiations, as generated by electricity or combustion, which have been found eminently satisfactory in certain specific applications of the invention. It will be understood, however, that the broad inventive concept is not specifically limited to infra-red radiations nor any particular band of such radiations.

The invention in its broad aspect is applicable to treatment of a wide variety of fruits, vegetables and agricultural products generally. However, the invention is here concerned particularly with the removal of oil from the outer coating of citrus fruit.

The skin oils of citrus fruit have long been recognized as an objectionable content of extracted citrus juices, citrus pulps and products such as marmalades made from the entire fruit and including the outer skin. Furthermore, the separated skin oils are highly valuable, particularly in the perfume industry, and their extraction and separation from the fruit is a rewarding enterprise for the value of such oils alone, in addition to eliminating such oils from the fruit and fruit products themselves. The removal of the skin oil from the otherwise undisturbed fruit may also be advantageous in preserving the fruit against deterioration or other objectionable results of oxidization, deterioration or rancification of such oils.

Heretofore apparatus and procedures have been devised for removal of the oil by a removal of the thin oil impregnated layer of skin by peeling or abrasion. Obviously such methods are costly and time consuming. Frequently it subjects the fruit to such abusive treatment as to be injurious thereto, and destroys its retail market value, as well as its keeping qualities. Further, the extraction of the oils from such separated thin skin layer is a difficult, expensive and inefficient task.

Applicant has discovered that by subjecting the surface to a relatively non-penetrating radiation, such as infra-red radiations, the heat generated at the skin surface will cause the oil to emerge on the surface. The action may be defined as a blistering action in which the applied heat or radiation breaks down the cell structure to release the oil which bubbles to the surface. It has further been found that upon application of infra-red radiations to the citrus fruit surfaces, the released oil may be readily vaporized to be drawn off as a vapor and subsequently condensed to economically produce the pure citrus oil.

Thus it will be noted that while a broad objective of the present invention is to provide for a modification of skin structures of a wide variety of fruits and vegetables through the application of radiations, the invention is more specifically concerned with the de-oiling of citrus fruit skins by radiation. The invention also provides an improved method for the extracting and recovery of citrus skin oils from the citrus fruit without destruction or mutilation of the fruit. It is also an object of the invention to provide for the sterilization of vegetation, the destruction of bacteria, and drying, particularly of citrus fruit. Numerous other objects, features and advantages of the present invention will be apparent from consideration of the following specification.

While the present form of the invention here presented by way of illustration may be broadly defined as the subjection of skin of citrus fruit to the effects of infra-red radiations, this form of the present invention contemplates the rolling or tumbling of the citrus fruit to be treated, in close proximity to a source or sources of infra-red radiations. In a practical application of the invention, infra-red generators are placed above a path of travel of citrus fruit. A preferable conveyor mechanism for such a path of travel is one which may induce a rolling action of the fruit in changing axes of rotation so as to present the entire surface of the fruit to the action of the infra-red rays.

Since various types of citrus fruit are characteristically different in their skin texture, as are various species of the same fruit, it would be inappropriate here to state either the degree of heat applied, the frequency of the radiations, or the duration to which the fruit is subjected. However, since the blistering of the fruit and the discharge of the oil is visually observable, those skilled in the art of citrus treatment may readily adjust the temperatures, distances from radiation source, and the time of exposure, by observation of the particular fruit being treated. Therefore, this form of the invention may be properly defined by stating that the fruit is subjected to the action of infra-red rays for a period sufficient to produce a blistering of the surface and a release of the citrus skin oil. The invention may further be defined as the method by which the fruit is so moved during exposure to infra-red rays as to present the entire surface area to a blistering effect of the infra-red radiations.

As indicated above the invention is not limited to the mere release of the oil from the skin through the action of infra-red radiations, but also comprehends the collection of oil vapors produced by the infra-red rays and the subsequent condensation of such vapors to provide a source of citrus skin oil free of any of the solid substances of fruit. Thus an appropriate apparatus may include a suction hood over the area at which the fruit is subjected to the infra-red radiations and a cooling of vaporized oils to condense the same and provide a liquid oil. It is to be again noted, however, that the invention is not limited to oil extraction, but may be used in sterilization, bacteria destruction, drying or treating applied surface materials such as wax.

From the foregoing it will be seen that the present invention provides a novel and improved method for the elimination of oil from citrus fruit skin without removal of the skin, peeling, abrasion, or the like, and further provides a means for the recovery of the oils extracted. As indicated above, the invention is by no means limited to citrus fruit, but may be applicable to various treatments of other forms of vegetation. Further, as has been noted, the intensity of the heat and the duration of the treatment, are matters readily determined by those skilled in the art and may be widely varied with various types of citrus fruit and with variations of skin texture of any particular type of citrus fruit. Therefore, it will be understood that in the practice of the invention, numerous changes, modifications and the full use of equivalents may be resorted to without departure from the spirit and scope of the invention, as outlined in the appended claims.

What I claim is:

1. The method of releasing occluded oil from the skin of citrus fruit which includes, the step of blistering said skin by the action of intense infra-red radiations.

2. The method of releasing and recovering occluded oil from the skin of citrus fruit which includes, the step of blistering said skin by the action of infra-red radiations and condensing vaporized oil produced by said blistering.

References Cited in the file of this patent
UNITED STATES PATENTS 2,419,875     Birdseye _____ Apr. 27, 1947